Jan. 25, 1944. W. J. BAKER 2,339,905
WEEDING IMPLEMENT
Filed May 17, 1943
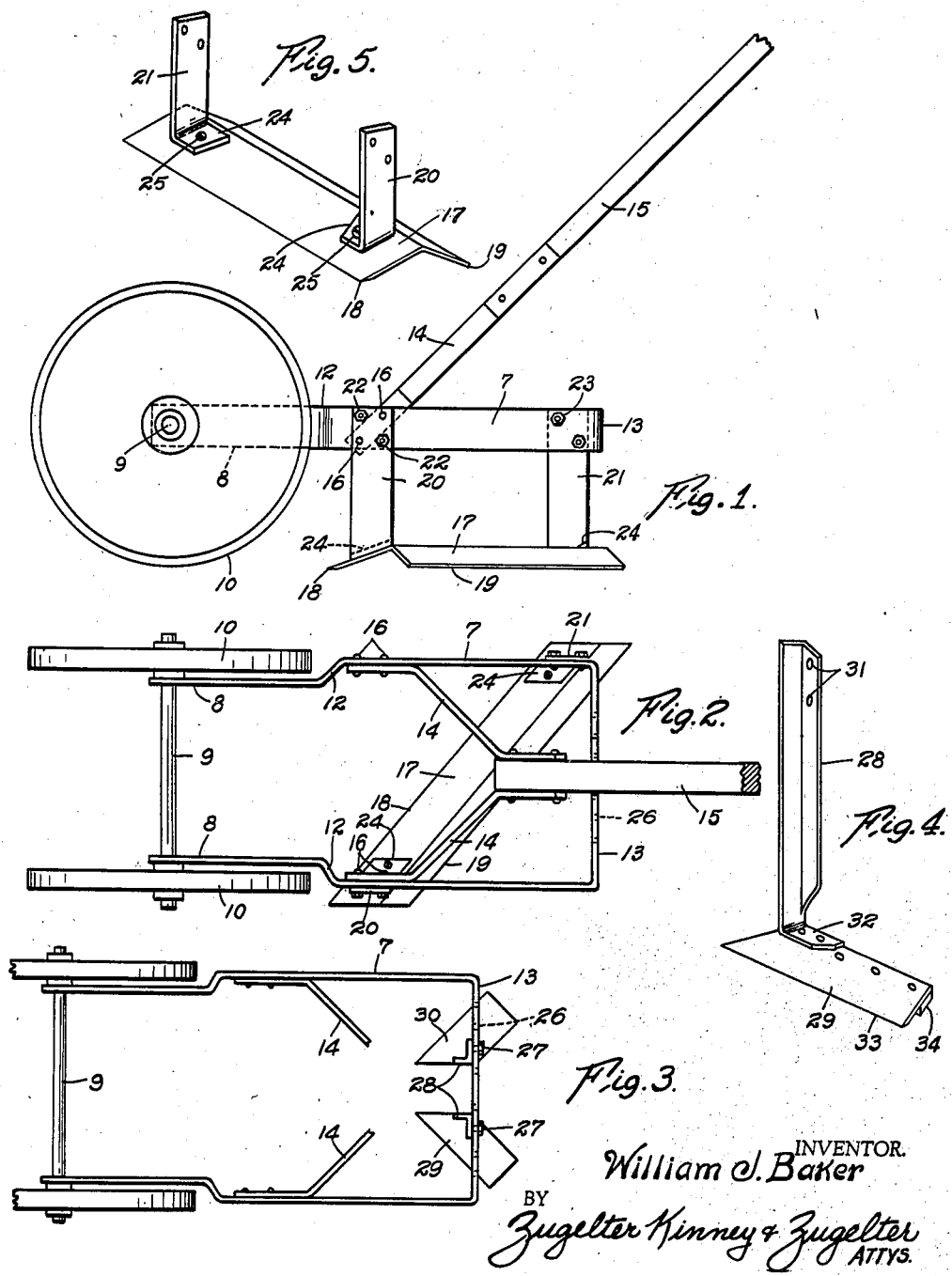
INVENTOR.
William J. Baker
BY
Zugelter Kinney & Zugelter
ATTYS.

Patented Jan. 25, 1944

2,339,905

UNITED STATES PATENT OFFICE 2,339,905

WEEDING IMPLEMENT

William J. Baker, Southgate, Ky.

Application May 17, 1943, Serial No. 487,289

2 Claims. (Cl. 97—59)

The present invention relates to a weeding implement, the primary purpose of which is to minimize the time and labor ordinarily expended in the weeding of garden and similar areas. This implement may be properly regarded as a "mechanical hoe."

An object of the invention is to provide an implement of the general character referred to, which will perform quickly and with a minimum amount of effort the sub-surface destruction of undesirable plant life in garden areas or the like.

Another object is the provision of a weeding implement which is easily manipulated, and which possesses the further advantages of simplicity and low cost, so that practically any gardener may enjoy the savings of time and effort attainable by the use thereof.

A further object of the invention is to provide a device of the character stated, which is so designed as to perform the weeding operation close to the garden plants without liability of injuring them, either by straddling the plants or by operating between rows of plants, depending upon the nature of the plants and their disposition within the garden area.

More specifically, it is an object of this invention to provide a mechanical weeding implement including means in the form of one or more oblique blades so arranged as to shear off undesirable plants or weeds at or below ground level, as the implement is wheeled over the area to be weeded.

The foregoing and other objects are attained by the means described herein and disclosed in the accompanying drawing, in which:

Fig. 1 is a side elevational view of the device of the invention incorporating a single oblique shearing blade.

Fig. 2 is a top plan view of the Fig. 1 device.

Fig. 3 is a view similar to Fig. 2, showing the application of a pair of oblique spaced shearing blades substituted for the single blade of Figs. 1 and 2.

Fig. 4 is a detail view in perspective, showing one of the pair of blades incorporated in the Fig. 3 device.

Fig. 5 is a detail view showing in perspective the single shearing blade of Figs. 1 and 2.

It has long been appreciated that amongst urban dwellers, a considerable proportion will consistently engage in the growing of vegetables and other food plants on a comparatively small scale. Gardeners in this class usually determine the garden size in accordance with the amount of leisure time available to them for planting, weeding, and cultivating. Much of the gardeners' time and energy are consumed in using the common hoe, which has been the most popular tool for weeding and cultivating the garden notwithstanding the fatiguing effort and slow progress accompanying the use of the hoe. By eliminating the use of the hoe in garden weeding, it is anticipated that the leisure time of the gardener may be greatly extended, thereby enabling him to care for a much larger garden with less effort than heretofore. This is one of the objectives in the present invention.

The weeding implement of this invention is to be distinguished from the well-known wheeled cultivator, which ordinarily is a bulky device too large for the ordinary gardener to store while it is not in use. Unlike the present device, the known type of cultivator generally comprises a series of small plows which are intended to uproot weeds from the garden area, and to thereby destroy them. It is a known fact, however, that the cultivator plows do not effectively destroy weed plants because the action of the plows results in leaving much earth about the weed roots, so that many weeds in effect are merely transplanted in the garden area while only a few are actually destroyed. The device of the present invention, however, performs an entirely different function in that its thin sharpened blade is advanced against all weed stems in its path, to cut them off either below ground level or substantially at ground level, depending upon the will of the operator. All weeds in the area traversed by the blade are thereby effectively destroyed at the first or second cutting operation, and with the expenditure of a minimum amount of time and effort. The ease and speed of the weeding operation will become apparent after an understanding of the device is gained from the following description.

As is evident from Figs. 1 and 2, the implement of this invention comprises a wheeled frame 7 of substantially rectangular configuration, the forward end extensions 8 of which are adapted to support an axle 9 for the wheels 10. At the locations 12 the frame preferably is slightly offset to place the rims of the wheels substantially within the body lines of the main portion of the frame. A cross-bar 13 connects the opposite sides of the frame at the rear. For propelling the wheeled frame across the surface of the earth, handle brackets 14 are furnished for the support of a suitable handle 15. The brackets may be fixed to opposite sides of the frame by means of rivets, bolts or other fasteners as indicated at 16. The handle preferably is inclined upwardly and rearwardly from anchorage points intermediate the forward and rear ends of the frame.

The main portion of the frame is adapted to support in oblique relationship to the major axis of the frame, a single shear blade 17 formed in the shape of an inverted V, to provide a sharpened leading edge 18 and a downwardly and outwardly extended tail edge 19, both of said edges extending the full length of the blade. The tail edge 19 is disposed at a slightly higher elevation than the sharpened leading edge of the shear blade, so that the tail edge will not drag as the leading edge performs a surface or sub-surface cutting off of weed stems.

It is to be noted that the leading edge of the shear blade extends obliquely across the full width of the frame, preferably as far beyond the frame sides as the full tread width of the wheels, the object being to perform the cutting of weed stems along a path as wide as the over-all width of the implement. The blade may be supported with its leading edge in substantial parallelism with the plane of the frame, by means of suitable blade supports 20 and 21 which depend vertically from the frame at opposite sides thereof. Blade support 21 is located at one side of the frame near the rear end thereof, while the forward blade support 20 depends from the opposite side of the frame at a location adjacent to the offset 12. It is desirable that the blade be removably attached to the frame, and for that reason the upper ends of the blade supports may preferably be bolted to the frame ends at 22 and 23.

To provide a simple attachment of the blade ends to the lower ends of the blade supports, said lower ends may be turned at an angle to provide lugs or feet 24. These lugs or feet may be bolted, riveted, or otherwise fixed to the shear blade. It will be noted that each lug or foot is not only turned inwardly, but each has its plane inclined forwardly and downwardly so as to support the leading portion of the shear blade at a forwardly and downwardly inclined acute angle relative to the surface of the ground. Thus, as the implement is rolled over the ground surface, the leading edge of the blade will be induced to perform a sub-surface shearing of weed stems, while the depth of penetration of the blade will be more or less established by reason of the tail edge 19 following the cut. When the device is used for shearing above ground level, the tail edge 19 will not contact the earth surface.

In the use of the implement, it should readily be appreciated that earth shaved off by the subsurface action of the shear blade will ascend the forward inclined portion of the blade, and will gravitate down the inclination of blade portion 19, thereby to replace the earth particles where they were previously removed by the shearing action of the leading edge 18. As the action of the blade is not as severe as a plowing action, the earth traversed by the implement of this invention need not be subsequently leveled or rearranged to protect the roots of nearby growing plants or garden products.

Whenever it may be necessary or desirable to recondition the oblique shear blade, it may be quickly removed and resharpened by detaching the blade supports from the frame sides, or if desired, the blade may be unscrewed at the locations 25. It may sometimes be desirable to thus remove the single oblique shear blade in order to substitute therefor the pair of blades shown in Figs. 3 and 4.

The substitute blades of Figs. 3 and 4 may be employed when it is desired to destroy weeds or other undesirable vegetation by operating the implement astride a row of plants. To accomplish this purpose, the rear crossbar 13 of the implement frame may be furnished with a series of perforations 26 arranged at spaced intervals to receive bolts or other fasteners 27 that position the blade supports 28 of the single shear blades 29 and 30. The upper ends of supports 28 may be perforated as at 31 to receive such bolts or fasteners, while the lower ends may be turned outwardly as indicated at 32 of Fig. 4, where they may be welded or otherwise fixed to the shear blades. Like the single shear blade of Fig. 5, the shear blades 29 and 30 are arranged with their leading sharpened edges 33 in oblique relationship to the major axis of the frame, and are moreover, inclined forwardly and downwardly in substantially the manner of the forward portion of the single blade. A bar 34 to which the blade 29 may be welded or otherwise fixed, furnishes suitable lateral support against bending or buckling of the blade in use. The opposed blades 29 and 30 may be spaced apart as shown in Fig. 3, so as to perform their cutting actions at opposite sides of a row of garden plants. The spacing of the blades may be altered by utilizing various ones of the perforations 26 in the frame crossbar, in attaching the blade supports thereto. The blades of Fig. 3 have their leading shearing edges directed outwardly and rearwardly, so that the cutting of weed stems will be performed with a shearing action oblique to the direction of movement of the frame. It will be understood, of course, that Fig. 3 represents the frame of Fig. 2 with the pair of shearing elements 29 and 30 substituted for the single shear blade 17 of Fig. 2.

From the foregoing it will be evident that the device of the invention is in the nature of a "mechanical hoe," as distinguished from the well-known cultivator having plows which do not necessarily sever the stems of undesirable vegetation in furtherance of its destruction. The improved device should readily be understood to facilitate and expedite the weeding of gardens, and to thereby greatly reduce the labor and time elements necessary to the proper care and success thereof.

What is claimed is:

1. In an implement of the class described, the combination of a frame having forward and rear ends, and a handle for advancing the frame along a desired path of movement, wheel means near the forward end of the frame, and shearing means intermediate the frame ends, said shearing means comprising a blade having a sharpened leading edge and a tail edge each of a length exceeding the width of the frame, said blade being of inverted V shape to provide a forward inclined surface carrying the sharpened leading edge, and a rearward inclined surface carrying the tail edge of the blade, and support means for the blade arranged to dispose the blade edges obliquely to the major axis of the frame and in substantial parallelism with the plane of the frame, with the tail edge of the blade at a slight elevation above ground level, and the sharpened leading edge at a lower elevation, whereby the latter edge operates at an elevation established by the tail edge for shearing off the stems of vegetation in the path of advancement of the implement.

2. In an implement of the class described, the combination of a frame having forward and rear ends, and a handle for advancing the frame along a desired path of movement, wheel means near the forward end of the frame, and shearing means intermediate the frame ends, said shearing means comprising a blade having a sharpened leading edge and a tail edge each of a length exceeding the width of the frame, said blade being of inverted V shape to provide a forward inclined surface carrying the sharpened leading edge, and a rearward inclined surface carrying the tail edge of the blade, and support means for the blade arranged to dispose the blade edges obliquely to the major axis of the frame and in substantial parallelism with the plane of the frame, with the tail edge of the blade at a slight elevation above ground level, and the sharpened leading edge at a lower elevation, whereby the latter edge operates at an elevation established by the tail edge for shearing off the stems of vegetation in the path of advancement of the implement, and means at the rear end of the frame for the support of alternative or supplemental shearing blade means.

WILLIAM J. BAKER.